United States Patent [19]

Stiller

[11] Patent Number: 4,599,511
[45] Date of Patent: Jul. 8, 1986

[54] CARD READING SYSTEM

[76] Inventor: Bruno V. Stiller, 2840 Telegraph Rd., Bannockburn, Ill. 60015

[21] Appl. No.: 592,401

[22] Filed: Mar. 22, 1984

[51] Int. Cl.⁴ .............................................. G06K 7/10
[52] U.S. Cl. .................................... 235/459; 235/483; 235/485; 235/489
[58] Field of Search ............... 235/482, 483, 490, 458, 235/460, 459, 485, 489, 382; 250/569

[56] References Cited

U.S. PATENT DOCUMENTS 3,417,233 12/1968 Stewart ........................... 235/483 X
4,134,539 1/1979 Hopkinson ...................... 235/482 X
4,423,320 12/1983 McPherson ......................... 235/482

FOREIGN PATENT DOCUMENTS 58-27283 2/1983 Japan ................................... 235/459

Primary Examiner—David L. Trafton
Attorney, Agent, or Firm—Lee, Smith & Zickert

[57] ABSTRACT

A system for generating a unique signal indicative of a particular identity carried by a card. The card has a series of zones along the sides thereof with holes extending through one or more of the zones. A receptacle is provided for the card, the receptacle including a longitudinal internal slot and a series of opto-electronic sensors which are spaced along the slot such that when the card is inserted within the slot, one of the sensors is positioned in registration with each of these zones. The card and the receptacle are formed such that the card can be inserted in the slot in only one proper orientation. One or more of the sensors is employed solely for determining proper insertion of the card.

7 Claims, 6 Drawing Figures

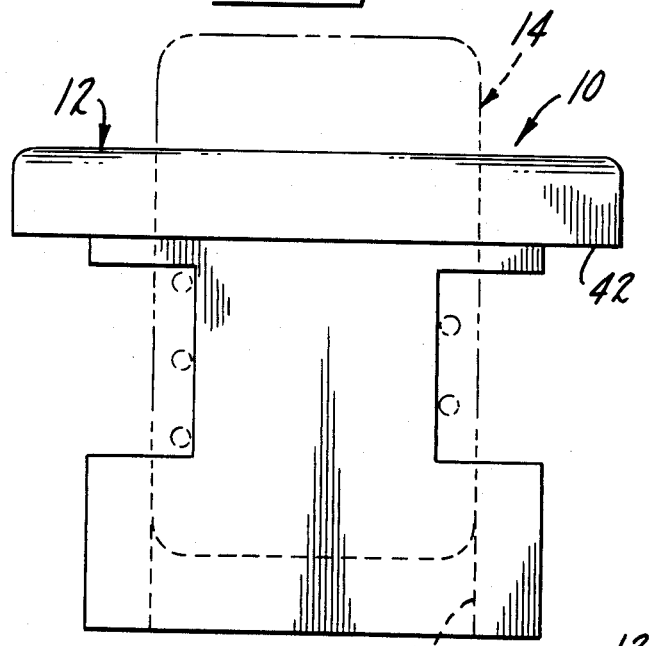
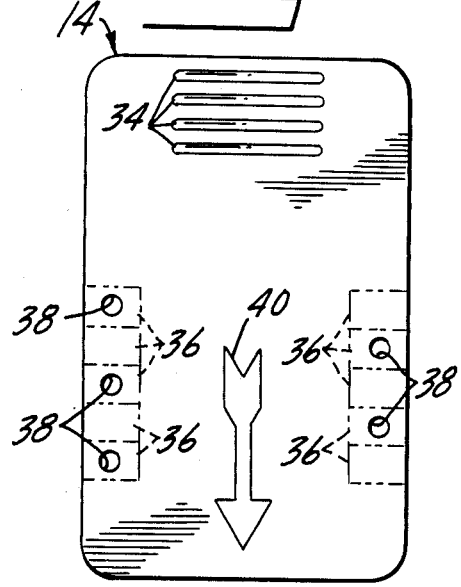
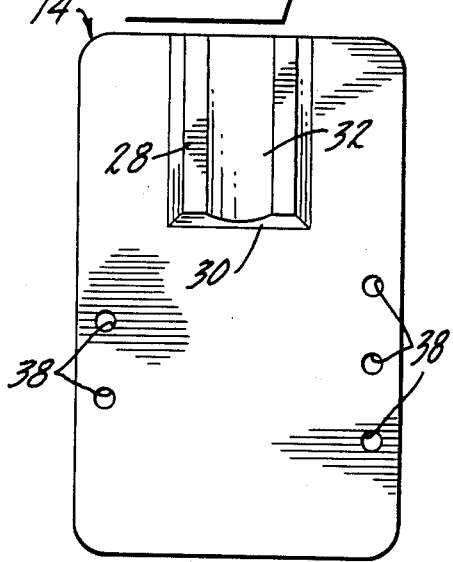
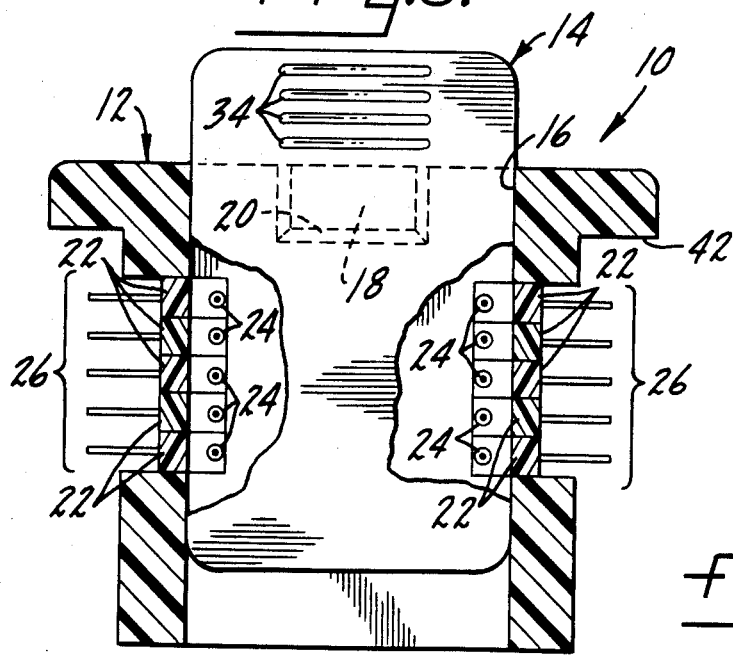
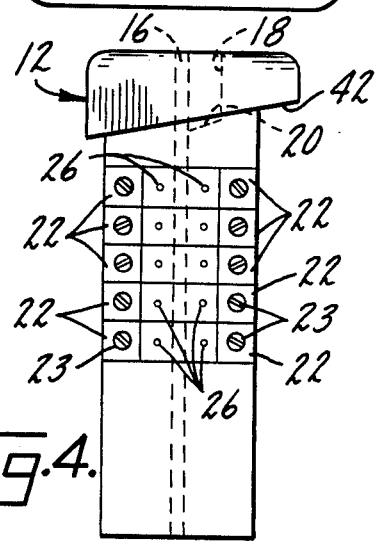

CARD READING SYSTEM

BACKGROUND OF THE INVENTION

This invention relates to card sensors, and in particular to a system for generating a unique signal indicative of an identity carried by a card which is inserted within a card-reading receptacle.

The invention is particularly useful in connection with automation of retail sales systems, although there are many similar uses which can be envisioned. In particular, the invention can be used as a "key" to both permit access to a retail store memory and also uniquely identify the various persons purchasing goods and the particular goods purchased. As a result, the cumbersome and expensive "zebra" striping of goods under the Universal Product Code System can be eliminated.

SUMMARY OF THE INVENTION

The invention comprises a system for generating a unique indication of an identity carried by a card. Primary components of the invention comprise a card which has a plurality of defined zones thereon, each zone having means to create an indication representative of a particular binary condition of the zone, and a receptacle for the card. The receptacle includes a plurality of card-reading elements spaced such that when the card is inserted within the receptacle, one card-reading element is positioned in registration with each zone on the card. The system is configured such that there is only one proper means of insertion of the card within the receptacle.

The receptacle has a longitudinal internal slot to accommodate insertion of the card. To assure proper orientation of the card within the receptacle, the receptacle has an indented guide adjacent the slot and the card has a corresponding protrusion extending outwardly therefrom which engages the guide when the card is inserted within the slot. The guide has a stop against which the protrusion seats to locate the card when inserted within the slot.

In accordance with the preferred embodiment of the invention, the protrusion includes a depression to aid the user when grasping the card. Furthermore, the slot in the receptacle extends the length of the receptacle in order to permit flat foreign objects, such as coins and the like, which are inadvertently or maliciously inserted therein, to pass through the receptacle without activating the reading elements therein.

In order to create the indication of a particular binary condition of a zone, each zone has either a hole therein or the absence of a hole which are equivalent to a binary zero or a binary one. The zones are preferrably located along the side edges of the card and at least one of the zones is positioned to indicate the proper insertion of the card within the receptacle. A plurality of opto-electronic sensors are installed within the receptacle such that when the card is properly and fully inserted within the receptacle, one such sensor aligns with each zone in order to detect the presence or absence of a hole through that zone.

BRIEF DESCRIPTION OF THE DRAWINGS

The invention is described in greater detail in the following description of an example embodying the best mode of the invention, taken in conjunction with the drawings, in which:

FIG. 1 is an elevational illustration of the receptacle according to the invention with insertion of the card being shown in phantom and with omission of the opto-electronic sensors for the purposes of clarity, FIG. 2 is a top view of the receptacle shown in FIG. 1 with omission of the card therefrom, FIG. 3 is a cross-sectional view taken along lines 3—3 of FIG. 2 and further illustrating a card installed in place within the receptacle with portions of the card broken away for clarity and also showing the opto-electronic sensors in their proper orientations in the receptacle, FIG. 4 is a side elevational illustration of the receptacle of FIGS. 1 through 3, but omitting the card for the purposes of clarity, FIG. 5 is a front elevational view of the card showing one form thereof having a plurality of zones, some of which have holes therethrough, and FIG. 6 is a rear elevational view of the card of FIG. 5.

DESCRIPTION OF AN EXAMPLE EMBODYING THE BEST MODE OF THE INVENTION

A system according to the invention for generating a unique signal indicative of an identity carried by a card is shown generally at 10 in the drawing figures. The system includes two primary components, a receptacle 12 and a card or "key" 14.

As shown, the key 14 is shaped to be inserted within a slot 16 in the receptacle 12. As best shown in FIGS. 3 and 4, the slot 16 extends the entire length of the receptacle 12 so that foreign matter, such as coins, which are inadvertently or perhaps purposely inserted within the slot can pass cleanly therethrough without inhibiting functioning of the system 10.

The receptacle 12 also includes a guide 18 adjacent the slot which, as described in greater detail below, is employed in combination with the card 14 to insure proper insertion and orientation of the card 14 within the slot 16 of the receptacle 12. The guide 18 has a sloped lower ledge 20 which forms a stop for the card 14. The ledge 20 is sloped toward the slot 16 to insure that dirt or other foreign debris does not accumulate in the guide 18, but tends to fall through the open bottom of the slot 16.

A series of card-reading elements in the form of opto-electronic sensors 22 are included in the receptacle 12. Five of the sensors 22 are shown installed on opposite sides of the receptacle 12. The sensors 22 are situated to straddle the slot 16 and are appropriately located so that when the card 14 is correctly inserted within the slot 16, the sensors 22 are in a proper orientation to detect the presence or absence of holes through the card 14. One or more screws 23 is used to attach each sensor 22 to the receptacle 12.

Each of the sensors 22 is preferably composed of two elements, a light-emitting diode and a light-sensitive element, such as the base of a light-activated transistor. The diode is positioned on one side of the slot 16 and the light-sensitive element is positioned directly opposite such that a beam between the diode and the light-sensitive element can be broken by insertion of the card 14, in a conventional manner. Thus, in FIG. 3, each of the sensors 22 is shown in cross section, with a diode or light-sensitive element located at a window 24. Directly opposite from the window 24 is a second window (not illustrated, but identical to the window 24) behind which is either a light-emitting diode or a light-sensitive element, depending on which element is behind the window 24. Thus, the cross section of the receptacle 12 in the direction opposite to that shown in FIG. 3 would be essentially identical with the exception that, of course, the guide 18 and ledge 20 would not be present.

A series of electrical wires 26 leads to each of the sensors 22, and the wires 26 are shown grouped in FIG. 3. The wires 26 can be connected, in a well-known fashion, to a source of electrical energy to energize the sensors 22 and also to detection circuitry which can determine the presence or absence of a blocking portion of the card 14 between the opposite windows of each sensor 22. The particular energizing and detecting circuitry can be conventional, and forms no part of the present invention.

The card 14 is generally rectangular in shape, and has a thickness no greater than the width of the slot 16. To assure proper orientation of the card 14 within the slot 16 of the receptacle 12, the card 14 includes a protrusion 28 extending outwardly therefrom which engages the guide 18 when the card 14 is inserted within the slot 16. The protrusion 28 has a bottom 30 which is angled at the same slope as the ledge 20 so that the protrusions 28 seats against the ledge 20 when the card 14 is inserted within the slot 16. The protrusion 28 is dimensioned to fit snuggly within the guide 18, and may also include a depression 32 to aid the user in grasping of the card 14. On the opposite side of the card from the protrusion 28, a series of horizontal channesl 34 may be included to further aid gripping of the card 14.

The card 14 includes a series of five zones 36 along each side edge thereof. There is no need for the zones 36 to be physically visible on the card 14 (hence their being shown in phantom only on FIG. 5). However, the zones 36 are positioned on the card 14 such that when the card is properly inserted within the receptacle 12, one of the sensors 22 is positioned in registration with one of the zones 36.

As shown, one or more of the zones 36 may include a hole 38 extending through the card 14. The holes 38 are so located such that when the card 14 is inserted within the slot 16 of the receptacle 12, if a zone 36 includes a hole 38, the hole 38 is in registration with the window 24 of the sensor 22 such that light from the light-emitting diode of the sensor can pass through the hole 38 and impinge upon the light-sensitive element of the sensor 22. Thus, the presence or absence of a hole 38 in each of the zones 36 can be indicative of a particular binary condition (that is, binary 1 or binary 0) of the zones.

In order to assure that the card 14 is properly inserted within the receptacle 12, at least one of the zones 36 may be chosen to indicate the proper insertion of the card. Preferrably, two such zones are chosen for this task. For example, turning to FIG. 5, the bottom zone 36 in the left column of zones includes a hole 38, while the bottom zone in the right column of zones 36 is opaque. The sensing circuitry for the system 10 (not illustrated) can be configured such that only a card which is fully inserted within the receptacle 12 and which has a hole 38 in the lower left-hand column and no hole 38 in the lower right-hand column can cause activation of the remaining circuitry used to determine the presence or absence of holes 38 in the remaining zones 36. Thus, in the embodiment of the invention shown in FIG. 5, there are ten zones 36, the lower two of which are used strictly for card-orientation purposes.

This leaves eight zones, or a total of 256 possible binary combinations and therefore 256 possible unique cards 14 which may be accommodated by the receptacle 12. By increasing the number of sensors 22 in the receptacle 12, the number of possible combinations of card 14 increases commensurately. For example, adding two more zones 36 to the card 14, and again reserving two zones solely for card orientation, gives a possibility of $2^{10}$ different hole combinations for the card 14, or 1024 different combinations.

Even though the card 14 includes the protrusion 28 which should clearly indicate the proper direction of insertion of the card 14 within the slot 16, the card 14 may also include an orientation arrow 40 to further guide the user. Also if desired, but not illustrated, the side edges of the card can include further grooves or other guides with corresponding grooves or guides being formed in the slot 16 to assure that the card 14 is properly guided into the receptacle 12. However, additional guides and the like increase the cost of fabrication of the system 10, and the preferred embodiment of the invention illustrated which has the protrusion 28 in combination with one or more dedicated zones 36 is adequate for the purpose of card orientation with respect to the slot 16 and proper and full insertion of the card 14 into the slot 16 of the receptacle 12.

For ease of fabriction and low cost, it is preferred that the card 14 and the receptacle 12 be composed of plastic whch can be molded into the shapes shown. The card 14 can be laminated from several layers of plastic with, say, the central layer being white such that the orientation arrow 40 can be formed by cutting away the outer layer or layers of the card 14 to expose the white inner layer to emphasize the arrow 40.

As shown in the drawings, the top of the receptacle 12 includes a peripheral flange 42. The flange 42 may be used for mounting the receptacle 12 wherever desired, and if the surface to which the receptacle 12 is not level, the flange 42 can be angled, as shown in FIG. 4, so that the top of the receptacle 12 is generally level and easily accessible to the user.

Various changes may be made to the invention without departing from the spirit thereof or scope of the following claims.

What is claimed is:

1. A system for generating a unique signal indicative of an identity carried by a card when the card is seated at a stationary card-reading position, comprising
    a. a unitary card having a plurality of defined zones thereon, each zone having means to create an indication representative of a particular binary condition of said zone, said means to create comprising a hole through said card in said zone to permit passage of light therethrough or the absence of a hole through said card in said zone to prevent passage of light therethrough,
    b. a receptacle for said card, said receptacle including a longitudinal internal slot to accomodate insertion of said card, and further including a plurality of card reading elements spaced such that when said card is inserted to a predetermined card-reading position within said receptacle, one reading element is positioned in registration with each said zone, and
    c. means to position said card at said predetermined card-reading position within said receptacle comprising an indented guide in said receptacle adjacent said slot and a corresponding protrusion extending outwardly from said card and engaging said guide when said card is inserted within said slot, said guide having a stop against which said protrusion seats to locate said card when inserted within said slot such that the combination of said guide and said protrusion limits the depth of insertion of said card within said slot and orients the position of said card.

2. A system for generating a unique signal according to claim 1 in which said protrusion includes a depression to aid the grasp of the user thereof.

3. A system for generating a unique signal according to claim 1 in which said slot extends the length of said receptacle to permit foreign objects to pass through said receptacle.

4. A system for generating a unique signal according to claim 1 in which said zones are located along at least one side edge of said card.

5. A system for generating a unique signal according to claim 1 in which at least one of said zones is positioned to indicate the proper insertion of said card to said predetermined card-reading position in said receptacle.

6. A system for generating a unique signal according to claim 1 in which each said card reading element comprises an opto-electronic sensor.

7. A system for generating a unique signal indicative of an identity carried by a card when the card is seated at a stationary card-reading position, comprising a. a unitary card having a plurality of defined zones thereon, at least one of said zones having a hole extending through said card and the presence or absence of a hole through said card in each of said zones being representative of a particular binary condition of said zone, b. a receptacle for said card, said receptacle including a longitudinal internal slot to accommodate insertion of said card and including a plurality of opto-electronic sensors spaced along said slot such that when said card in inserted within said slot to a predetermined card-reading position, one said sensor is positioned in registration with each said zone, c. a guide in said receptacle adjacent said slot and a corresponding protrusion extending outwardly from said card, said protrusion engaging said guide when said card is inserted within said slot, d. a stop in said guide positioned to engage said protrusion and locate said card at said predetermined card-reading position when said card is inserted with said slot, and e. means to determine proper insertion of said card within said slot.

* * * * *